(No Model.) 2 Sheets—Sheet 1.

H. C. RILEY.
GATE.

No. 396,173. Patented Jan. 15, 1889.

Fig. 1.

WITNESSES:

INVENTOR:
H. C. Riley
BY
ATTORNEYS.

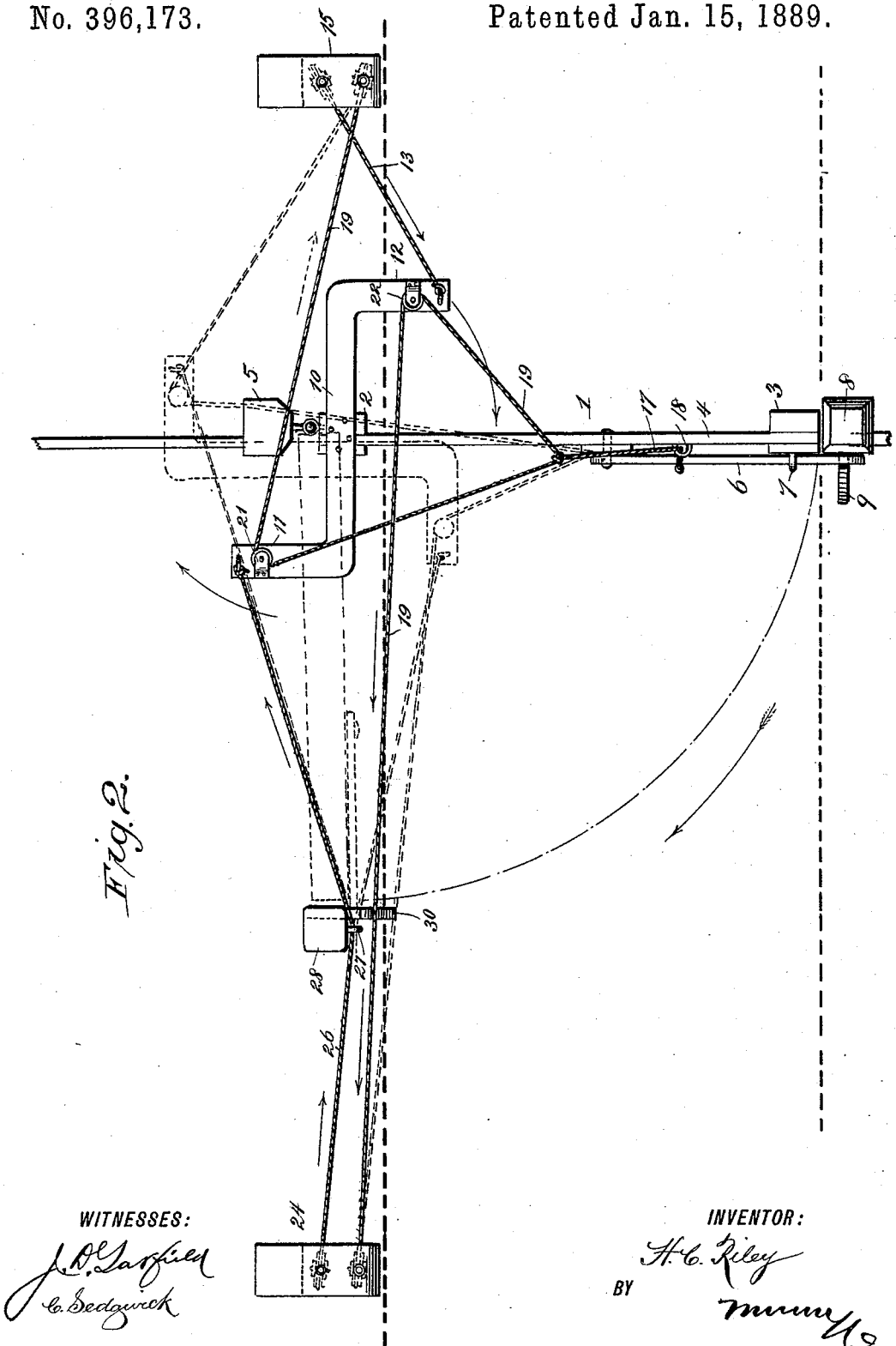

UNITED STATES PATENT OFFICE.

HARVEY C. RILEY, OF PERRYVILLE, MISSOURI, ASSIGNOR TO HIMSELF AND ROBERT M. WILSON, OF SAME PLACE.

GATE.

SPECIFICATION forming part of Letters Patent No. 396,173, dated January 15, 1889.

Application filed October 29, 1888. Serial No. 289,377. (No model.)

*To all whom it may concern:*

Be it known that I, HARVEY C. RILEY, of Perryville, in the county of Perry and State of Missouri, have invented a new and improved Gate, of which the following is a full, clear, and exact description.

This invention relates to swinging gates and mechanism for operating the same without alighting from a vehicle, and has for its object to provide a gate and mechanism of this character so constructed and arranged that the gate may be easily and effectively opened by a person in a vehicle approaching the gate in either direction and closed after the vehicle has passed through the gate-opening without alighting from the vehicle.

The invention consists in a swinging gate and in mechanism for operating the same, constructed and arranged as hereinafter described and claimed.

Reference is to be had to the accompanying drawings, forming a part of this specification, in which similar figures of reference indicate corresponding parts in both figures.

Figure 1 is a perspective view of a swinging gate and its operating mechanism constructed in accordance with this invention, and Fig. 2 is a plan view thereof.

1 indicates a gate constructed in the usual form, with uprights 2 3 and horizontal bars 4, and hinged at one end to a gate-post, 5. The gate 1 is provided with a latch, 6, pivoted to one of the horizontal bars 4 and vertically movable in a keeper or guide-bracket, 7. When the gate is in closed position, the latch 6 automatically moves into engagement with a catch, 9, on the post 8.

In order to operate the gate, a horizontal bar, 10, essentially Z-shaped, is secured to the top of upright 2, to extend crosswise to the gate, the arms 11 12 thereof projecting from its ends in opposite directions and at right angles thereto. To the end of arm 12 is secured a cord, 13, which extends to and passes over a pulley, 14, on a bracket-arm, 15, on a post, 16, located at the side of a road approaching the gate. The cord 13 hangs down from the pulley 14 a sufficient distance to allow it to run out when drawn forward by the swinging of arm 12 and the opening of the gate.

By means of cord 13 and bar 10, with arm 12, the gate may be closed, as hereinafter set forth. A cord, 17, is secured at one end to latch 6, passes upward through a guide, 18, on the gate, and is secured to a cord, 19, suspended below bracket-arm 15 on post 16 and extending over a pulley, 20, on arm 15, to a pulley, 21, on the outer portion of arm 11, from thence to and over a pulley, 22, on the outer portion of arm 12, and from the pulley 22 to and over a pulley, 23, on a bracket-arm, 24, at the top of a post, 25, at the side of the road and located on the opposite side of the gate-opening from post 16.

A cord, 26, is secured to the end of arm 11 and extends through a guide, 27, on a post, 28, at the side of the road to and over a pulley, 29, on bracket-arm 24, and is suspended therefrom. The post 28 is located at such a distance from post 5 that when the end of gate 1 is swung to the post 28 the latch 6 may be engaged with a catch, 30, on post 28, thereby fastening the gate in opened position. The distance of post 16 from post 5 and post 25 from post 5 is such that a person in a vehicle may reach the suspended ends of cords 13 and 19 at the post 16, or the suspended ends of cords 26 and 19 at the post 25, and operate the gate, with room enough between the gate-opening and the team to permit the gate to swing. The suspended ends of the cords 13, 19, and 26 are of sufficient length to run out over pulleys 14 20 and 23 29 when the gate is swung open, and are provided with pins 31, or other suitable stops, to prevent their being accidentally drawn off the pulleys. It will be seen that the cord 17 being fastened at one end to cord 19 between pulleys 21 and 22, by drawing on either end of cord 19 the latch 6 may be lifted and gate 1 unfastened. To open the gate when a person has arrived opposite post 25, the end of cord 19 at post 25 is pulled until latch 6 is raised to clear catch 9, when a continued pull on the cord 19 acts on arm 12 to draw it back and swing gate 1 open to post 28. Upon passing through the gate-opening and arriving opposite post 16 the gate may be closed by pulling on the end of cord 13, thereby drawing the arm 12 back to its original position, the latch 6 riding into engagement with catch 9.

To open the gate when a person has arrived in a vehicle opposite post 16, the gate is first unfastened by pulling on cord 19 at post 16, and then, by continuing the pull, drawing on arm 11, and thereby swinging gate 1 open to post 28. Upon passing through the gate-opening and arriving opposite post 25 the gate is closed by pulling on the suspended end of cord 26, the latch 6 automatically engaging catch 9, as before. By means of the arrangement of cords and pulleys in conjunction with the latch and the bar 10 with arms 11 and 12, as hereinbefore set forth, an efficient means is provided for opening and closing a swinging gate without alighting from a vehicle. The horizontal arm 10 with the arms 11 and 12 arranged at right angles thereto in opposite directions and mounted on the hinged portion of the gate, presents, with the arrangement of cords and pulleys above described, the most serviceable form of leverage for opening and closing the gate.

Having thus described my invention, what I claim as new, and desire to secure by Letters Patent, is—

1. The combination, with a swinging gate having a horizontal double-ended lever-bar with angular arms at its ends, mounted on the hinged end of the gate, of posts located at the side of a road on opposite sides of the gate, a gate-operating cord leading from one of the posts to one end of the double-ended lever, a gate-operating cord leading from the other post to the other end of the double-ended lever, a cord for operating the gate-latch, leading from one of the posts to one angular arm of double-ended lever, over a guide thereon, to and over a guide on the other angular arm of double-ended lever, and from thence to the other post, and a latch-operating branch cord leading from the latch to the main operating latch-cord and connected therewith between the cord-guides on the angular arms of double-ended lever-bar, substantially as shown and described.

2. The combination, with swinging gate 1, having the horizontal Z-shaped bar 10, with arms 11 and 12, secured to the top of hinged upright 2, and the pivoted latch 6, of the post 16, with arm 15, and post 25, with arm 24, located at the side of a road on opposite sides of and at a suitable distance from the gate 1, a gate-operating cord, 26, with an end suspended beneath arm 24 of post 25, passing over a pulley, 29, thereon and extending and secured to arm 11 of Z-shaped bar 10, a gate-operating cord, 13, with an end suspended beneath arm 15 of post 16, passing over pulley 14 thereon and extending and secured to arm 12 of Z-shaped bar 10, a main latch-operating cord, 19, suspended beneath arm 24 of post 25, passing over a pulley, 23, thereon, extending to and passing over a pulley, 22, on arm 12 of Z-shaped bar 10, from thence to and over a pulley, 21, on arm 11 of bar 10, to and over a pulley, 20, on arm 15 of post 16, from which it is suspended, and a branch operating-cord, 17, extending from latch 6 to main latch-cord 19 and secured thereto between pulleys 21 and 22, substantially as shown and described.

3. The combination, with gate 1, hinged to fence-post 5, and having a pivoted latch, 6, and a Z-shaped double-ended lever bar, 10, with angular arms 11 and 12 at its ends, of a post, 28, located at the side of a road a distance from fence-post 5 equal to the length of the gate, and having a latch-catch, 30, a post, 25, with an arm, 24, and a post, 16, with an arm, 15, located at the side of a road on opposite sides of the gate and at a suitable distance from post 5, a gate-operating cord, 26, connected to arm 11 of bar 10 and extending to and over a pulley, 29, on arm 24 and suspended therefrom, a gate-operating cord, 13, connected to arm 12 of bar 10 and extending to and over a pulley, 14, on arm 15, and suspended therefrom, a main operating latch-cord, 19, suspended from and extending over a pulley, 23, on arm 24, to and over a pulley, 22, on arm 12, to and over a pulley, 21, on arm 11, and from thence to and over a pulley, 20, on arm 15, and suspended therefrom, and a branch latch-cord, 17, extending to main latch-operating cord 19 and secured thereto between pulleys 21 and 22, substantially as shown and described.

HARVEY C. RILEY.

Witnesses:
JOHN B. DAVIS,
W. J. DOERS.